(12) United States Patent
Gill

(10) Patent No.: US 6,921,115 B2
(45) Date of Patent: Jul. 26, 2005

(54) COUPLING FOR PIPE INCLUDING AN INCLINED FLANGE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 55 days.

(21) Appl. No.: 10/446,302

(22) Filed: May 28, 2003

(65) Prior Publication Data

US 2004/0239117 A1 Dec. 2, 2004

(51) Int. Cl.$^7$ .............................................. F16L 17/00
(52) U.S. Cl. ...................... 285/365; 285/408; 285/110; 285/288.1
(58) Field of Search ............................... 285/365, 366, 285/367, 408, 409, 140, 110, 111, 112, 288.1, 288.2

(56) References Cited

U.S. PATENT DOCUMENTS

| | | | |
|---|---|---|---|
| 1,282,959 A | | 10/1918 | Sears |
| 1,867,891 A | * | 7/1932 | Reynolds ...................... 285/367 |
| 2,739,828 A | | 3/1956 | Schindler et al. |
| 2,769,648 A | * | 11/1956 | Herman ........................ 285/366 |
| 2,903,279 A | * | 9/1959 | Bergstedt et al. ............ 285/408 |
| 2,962,305 A | | 11/1960 | McCarthy et al. |
| 3,241,867 A | | 3/1966 | Guarnaschelli |
| 3,521,912 A | | 7/1970 | Maurer |
| 3,669,474 A | * | 6/1972 | Bode ............................ 285/365 |
| 3,776,579 A | | 12/1973 | Gale |
| 3,937,501 A | | 2/1976 | Weinhold |
| 4,252,349 A | | 2/1981 | Mahoff |
| 4,305,607 A | | 12/1981 | Westerlund et al. |
| 4,326,737 A | | 4/1982 | Lehmann |
| 4,448,448 A | | 5/1984 | Pollia |
| 4,496,176 A | | 1/1985 | Weinhold |
| 4,526,409 A | * | 7/1985 | Schaefer ................... 285/288.1 |
| 4,561,678 A | | 12/1985 | Kunsman |
| 4,693,502 A | * | 9/1987 | Oetiker ........................ 285/365 |
| 4,695,080 A | * | 9/1987 | Oetiker ........................ 285/365 |
| 4,717,179 A | | 1/1988 | Haberstock et al. |
| 5,354,100 A | | 10/1994 | Wall et al. |
| 5,380,052 A | * | 1/1995 | Hendrickson ............... 285/365 |
| 5,387,017 A | | 2/1995 | Gill |
| 6,086,109 A | | 7/2000 | Esser |
| 6,186,560 B1 | * | 2/2001 | Gill ............................. 285/305 |
| 6,375,228 B1 | | 4/2002 | Klemm et al. |
| 6,467,812 B1 | * | 10/2002 | Klemm et al. ............... 285/112 |

* cited by examiner

Primary Examiner—David Bochna
(74) Attorney, Agent, or Firm—Mallinckrodt & Mallinckrodt

(57) ABSTRACT

A coupling for joining two pipes in end-to-end relationship includes flanges which are sealably secured to end sections of pipes to be connected. The flanges form front inclined faces and adjacent front flanges that are slidably received within opposite end openings of a cylindrical coupling. A groove or shoulder is formed at the rear end of the front flanges that cooperate with jaws extending from the ends of the cylindrical coupling to secure the received pipe end portions in the cylindrical coupling to thereby join the pipes together. One or more gaskets fit in the cylindrical coupling between the ends thereof with gasket arms that abut against the inclined surface so that fluid pressure in the pipes force the gasket arms against the inclined faces to provide a seal between the joined pipes. A stop may be provided to limit the sliding travel of the cylindrical coupling with respect to the flanges.

33 Claims, 10 Drawing Sheets

COUPLING FOR PIPE INCLUDING AN INCLINED FLANGE

BACKGROUND OF THE INVENTION

1. Field

The invention is in the field of cylindrical couplings for joining pipes, hoses, valves, pipe and hose fittings, dead ends, and lids for pressure vessels end-to-end wherein the end portions to be joined include flanges and the coupling holds a gasket for forming a seal.

2. State of the Art

As used herein, including the claims, the word pipe includes not only lengths of pipe, but also valves, hoses, and pipe and hose fittings where a connection is made to a pipe or other hoses or fittings.

In making a conventional vertical radial flange connection of two pipes, two flanges having a series of holes in a bolt circle are mounted on the end portions of the two pipes to be joined, either by welded or threaded joints. The flanges are connected together by bolts while compressing a seal placed between them. Unlike vertical radial flanges, there are also VIC-RINGS produced by Victaulic Company of America, Easton, Pa., U.S.A., over which a gasket is mounted to seal the pipe, and the coupling is made of two arcuate halves. The two ends of the halves are keyed against opposite shoulders and are held together around the gasket by means of bolts passed through two pads. There is also a mechanical coupling known as the DEPEND-O-LOCK coupling produced by Brico Industries Inc., Atlanta, Ga., U.S.A. which coupling is a split sleeve mounted on the end portions of the two pipes to be joined against two key shoulders constructed by welding two rings around the two pipes. The split ends of the sleeve are held together by means of two linear flanges and the bolts. In the above mentioned couplings, in each case a gasket is held in place by the mechanical pressure of the bolts. In the case of the Victaulic and Brico couplings cited above, gaskets are seated around the end portions of the two pipes being connected. The Victaulic Company of America and Brico Industries Inc. both recommend seven steps to install their couplings, where five of the seven steps are common to both of the couplings. These common steps are:

1. Lubricating of the gasket, the end portion of the two pipes, and the interior of the coupling.
2. Aligning the ends of both pipes.
3. Spacing the pipes properly to mount the couplings.
4. Positioning the coupling housing over the gasket to assure the housing keys properly engage the shoulders.
5. Inserting bolts through the flanges and tightening the bolts evenly.

The current inventor holds the following patents on cylindrical couplings U.S. Pat. Nos. 5,387,017; 5,868,441; 5,794,988 and 6,186,560. This invention provides improved means for the preparation of the end portion of pipes and said means to accommodate a sealing gasket between the pipe ends, which gasket is premounted with a snug fit inside the cylindrical coupling. This is also an improvement over the design in FIGS. 11 and 12 of U.S. Pat. No. 5,868,441, and FIG. 17 of U.S. Pat. No. 6,186,560, where the vertical radial flange (shoulder) is integral or is an inserted end portion of the shank or pipe or hose; the flange is not inclined and it is not welded around the pipe with an offset from the end of the pipe to accommodate the gasket.

In the real world, pipe is produced with plus or minus diametrical tolerances, and plus and minus tolerances are also applied to the ovalness of pipe. Between these two types of tolerances (ovalness and diameter) using cylindrical couplings becomes a problem. Therefore cylindrical couplings are not usually used. Cylindrical couplings, however, are less expensive and much easier to install than other couplings such as those described in this Prior Art section. The flange of the invention in combination with a cylindrical coupling and the gasket provide the quickest and most economical means for the cylindrical couplings to connect two pipes. The invention shortens the over-all length of the cylindrical coupling and reduces cost. The invention provides a free footed seal protected in an enclosure from the damaging high velocities of fluid flowing in pipe line. In installing the cylindrical coupling, this invention eliminate or make easier the five steps mentioned above.

SUMMARY OF THE INVENTION

The invention provides a flange mounted around the end portion of a pipe, where the front face of the flange is offset from the end of the pipe and inclines radially outwardly toward the end of the pipe. A cylindrical coupling extends over and between respective flanges when pipes with flanges are joined. The flange provides a key shoulder (groove) located at a predetermined offset from its front face for a locking means of the coupling to be keyed against the shoulder. At least one end of the flange is welded to the pipe providing a leakproof joint of desired strength. The invention also provides an inverted "V" type gasket or other configuration of gasket with a snug fit against the inside of the cylindrical coupling.

The gasket is premounted inside the cylindrical coupling and is kept inside the coupling by the locking means of the coupling. The natural flare of two arms of the inverted "V" gasket or other configuration of gasket is greater than the flare of arms when the coupling is fully mounted and keyed against the shoulders provided by the two flanges. When opposite inclined faces of two flanges move toward the center of the coupling, first they push the free end of each gasket arm in rotational movement toward the center of the coupling. The two free end's bottoms (feet) of the gasket always remain in a free state, they do not rest on any surface. The outer surface of the arms of the gasket through their memory compress against the inclined front faces of the flanges. Under fluid pressure inside the pipe line, the gasket seals against the inclined front flange face and the coupling inside surface to seal the joint against fluid leakage.

The extended or projected ends of two pipes joined under the inclined front faces of the flanges provide a shelter for the gasket and for the free ends of its arms from the ravage of abrasive high velocities in the pipe line. The cylindrical coupling may be slid on the flange of one of the pipes to allow separation of the pipes and to expose the ends of the pipes and allow replacement of the gasket. A stop may be provided to limit the extent of travel of the cylindrical coupling over the flange so that it does not slide completely off the flange.

The invention also provides an improved expansion joint by installing a plurality of the same gaskets in series making a bellows which eliminates the friction against gaskets as is the case in my invention of U.S. Pat. No. 6,186,560 B, FIG. 6.

THE DRAWINGS

The best mode presently contemplated for carrying out the invention is illustrated in the accompanying drawings, not drawn to any scale, in which.

DETAILED DESCRIPTION OF THE ILLUSTRATED EMBODIMENT

All the elements of the invention are installed or constructed around a pipe in the fashion of circular rings. Therefore, it is considered unnecessary to show figures other than longitudinal sections. At the center of separation G between two pipes the elements of the invention are divided symmetrically into two halves. While an element is explained by the numeral at the left side, its corresponding element simultaneously is explained on the right by the numeral with alphabetical subscript.

Figure 1:
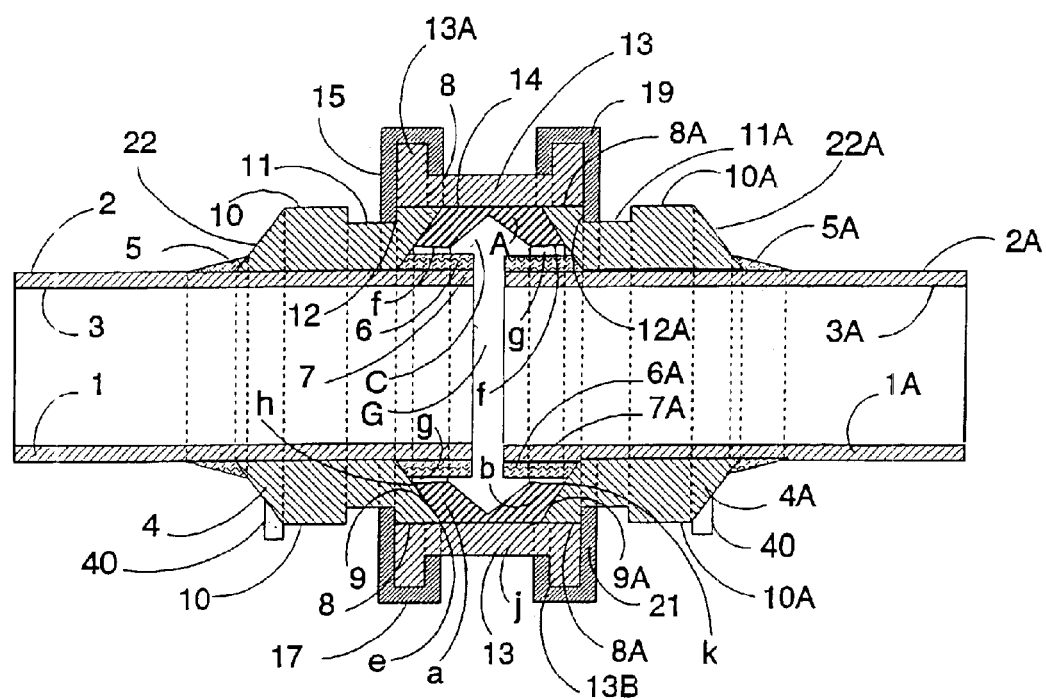
FIG. 1 is a longitudinal vertical section taken through a mounted coupling over the ring type inclined flanges welded around the end portions of two opposite pipes and a gasket held between the flanges.

In FIG. 1, opposite pipes 1 and 1A are shown with outer and inner surfaces or diameters 2, 2A and 3, 3A. The opposite pipes are connected by a cylindrical coupling 13. Cylindrical flange bodies 4 and 4A having axial openings therethrough are slid onto and are welded around the end portions 7 and 7A of pipes 1 and 1A, with the front welding shown by 6 and 6A. To provide shoulders 12 and 12A for the locking elements 15, 17, 19 and 21 of the cylindrical coupling, peripheral grooves 11 and 11A are constructed around the outside circumference of the cylindrical flanges 4 and 4A.

Front flange faces 9 and 9A incline forwardly toward the corresponding ends of the pipes as they extend radially outwardly. Each front flange face 9 and 9A is offset back from the end of the pipe and each offset is shown in FIG. 1 by the length of the welding 6 and 6A. However, in welding the flanges to the pipes, it is not necessary to extend the welding to the end of the pipe. It is merely necessary to provide enough welding to seal the flange to the pipe and to securely hold it in position on the pipe. The back flange ends are shown by 22 and 22A which are preferably constructed with inclined back faces parallel to the front inclined faces 9 and 9A of the flanges. The parallel faces eliminate the waste of material in construction of the flanges, but are not necessary. Welding of the back ends of the flange bodies 4 and 4A is shown by welds 5 and 5A, respectively. This welding may be eliminated on small pipes where the increased strength provided by the back welds is not necessary.

Figure 3:
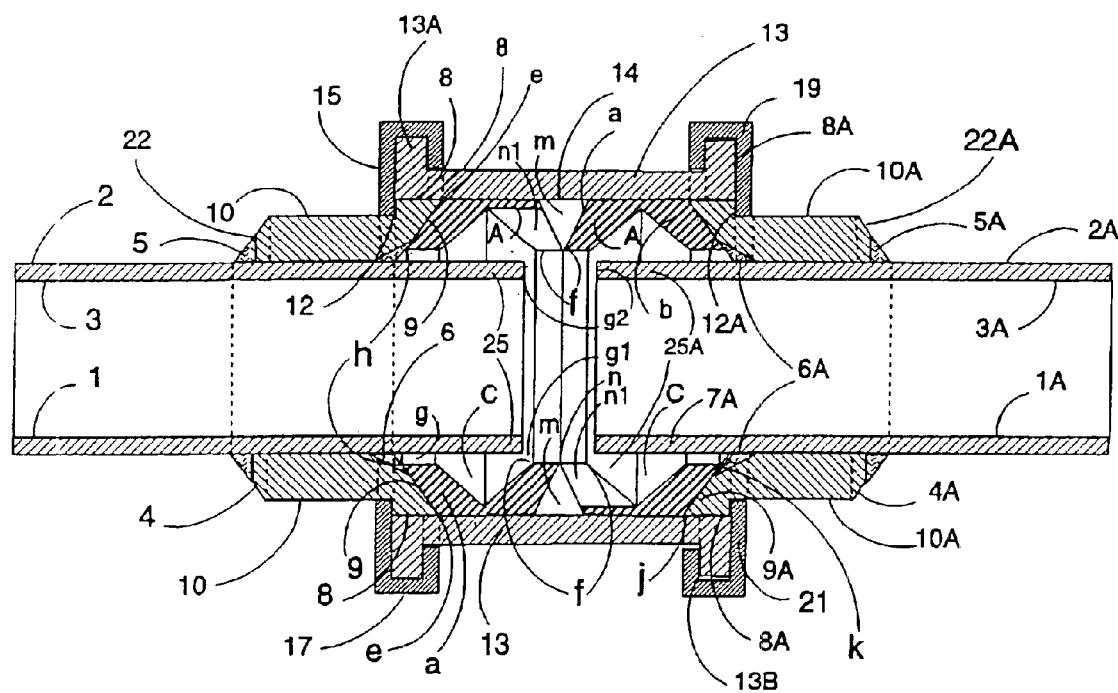
FIG. 3 is a longitudinal vertical section similar to that of FIG. 1, but showing a further embodiment thereof.

The flange bodies 4 and 4A have an outer diameter indicated at 10 and 10A and include front flange portions 8 and 8A forming outer interface surfaces of diameter 10 and 10A adapted to fit into opposite end openings of cylindrical coupling 13. Grooves 11 and 11A along with shoulders 12 and 12A formed at the forward ends of grooves 11 and 11A form a means cooperable with the cylindrical coupling so that the cylindrical coupling can be secured to the flange bodies and thus to the pipes to be connected. In most cases, the shoulders 12 and 12A are the important features cooperable with the cylindrical coupling (such shoulders prevent separation of the pipe ends from the coupling) so full grooves 11 and 11A may not be necessary in particular embodiments, in which case the bottom of grooves 11 and 11A can extend to the back ends of the flange bodies, as shown in FIG. 3, without a back groove shoulder. Which construction of the flange body is used may depend upon the manufacturing technique used in making the flange bodies. If machined, a full groove may be easier. If cast, extending the bottom of the groove to the back end will save material. Which construction is used will also depend upon whether the grooves are used to limit the allowed amount of relative movement of the joined pipes toward one another or whether that movement is limited by the coming together of the pipe ends.

The cylindrical coupling 13 includes opposite ends with end openings therein to receive the end portions of pipes to be connected. As shown, such openings receive front flange portions 8 and 8A therein in close fitting relationship. An inner surface 14, generally a smooth surface, extends through the cylindrical coupling 13 between the end openings, with a gasket A snugly fit within and against such inner surface. Cylindrical coupling 13 also includes radial end flanges 13A and 13B with locking elements or jaws 15, 17, 19, and 21 mounted for movement into or out of grooves 11 and 11A. When positioned in grooves 11 and 11A, the jaws act against shoulders 12 and 12A to lock coupling 13 in place around the pipe ends. The jaws are preferably moved radially by camming action of pins or bolts (not shown) which extend from the jaws into camming grooves (not shown) in the coupling flanges 13A and 13B. Construction and operation of a cylindrical coupling with such camming jaws is shown and described in detail in my cited U.S. Pat. Nos. 5,387,017 and 5,868,441, incorporated herein by reference.

In coupling the opposite pipe ends together, first coupling 13 is mounted over front flange portion 8 of flange body 4 around pipe 1 and the set of jaws 15 and 17 are lowered into groove 11 to lock the coupling in place. Next, the front flange portion 8A of flange body 4A around pipe 1A is pushed into the coupling with the inclined face 9A of flange body 8A squeezing the legs a and b of gasket A by reducing their flare. Inclined front flange faces 9 and 9A of flange bodies 4 and 4A keep moving toward one another as the opposite pipes 1 and 1A are moved together compressing against outer ends h and k of gasket legs a and b till the respective front flange faces stop against outer sides e and j of the gasket legs. When the groove 11A is in lockable position, jaws 19 and 21 are lowered into the groove 11A and are keyed in against shoulder 12A to lock the coupling 13 in place on flange body 4A. Leg a of gasket A compresses against face 9 and leg b compresses against face 9A. Thus, leakage of fluid from cavity C is prevented. Pressurized fluid in cavity C increases the force exerted by legs a and b against faces 9 and 9A to enhance this sealing. The incline of the faces 9 and 9A of the flange bodies augment the functioning of gasket A. The gasket is kept free at its feet depicted by f, and designed gap g is provided between f and welding 6 and 6A. Predetermined separation G is provided between the two ends of pipes to allow for their relative movement over a predetermined range such as may be caused by expansion and contraction of the joined pipes.

To separate the pipes or to provide access to the area between the pipe and portions 7 and 7A and the inclined flange faces 9 and 9A, jaws 15, 17, 19 and 21 may be raised and cylindrical coupling 13 slid axially over one of the flanges 4 or 4A to expose the pipe ends. It is preferred that a stop 40 be provided at the back end of each flange 4 and 4A to stop sliding travel of the cylindrical coupling 13 to prevent such cylindrical coupling 13 from falling off of either flange 4 or 4A onto pipe 1 or 1A, respectively, where it would have to be lifted to be slid back onto flange 4 or 4A. The stop 40 may be a single pin or projection, a plurality of pins or projections, or a flange extending from and around flanges 4 and 4A, the axial length of the flanges 4 and 4A are preferably equal to or less than the length of coupling 13.

Figure 2:
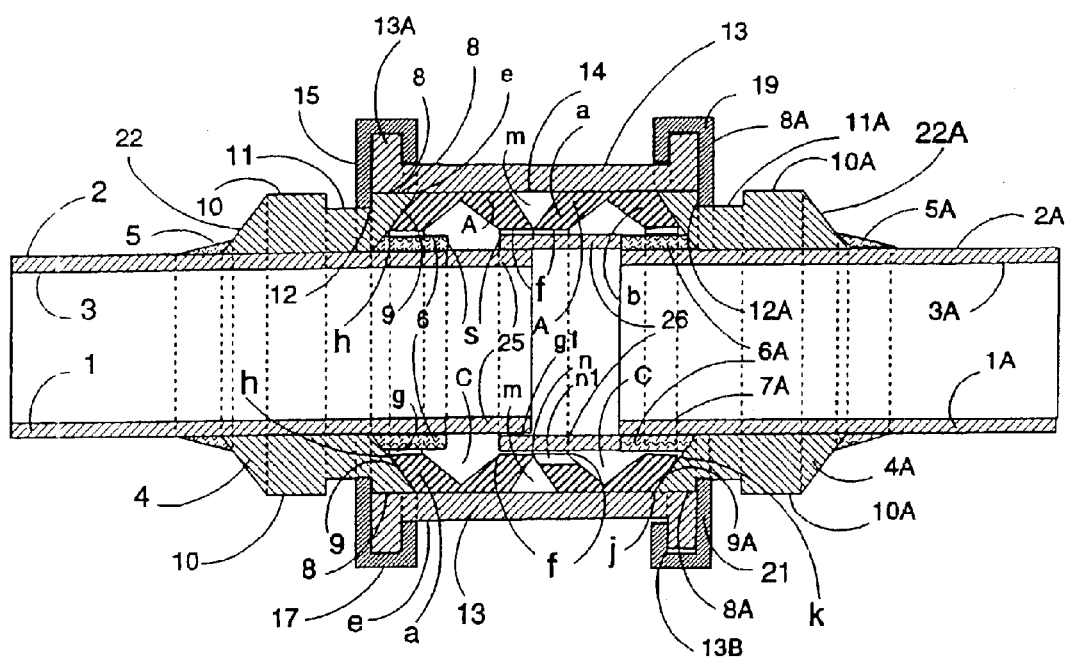
FIG. 2 is longitudinal vertical section similar to that of FIG. 1, but showing an expansion joint formed by the coupling with a telescoping sleeve and two gaskets installed in series between the flanges.

FIG. 2 shows a larger separation between the ends of the joined pipes 1 and 1A thereby providing more of an expansion joint effect for the coupling than is present in FIG. 1. With this larger separation and increased length of cylindrical coupling 13, two gaskets A are positioned side-by-side in cylindrical coupling 13 against inner surface 14 instead of the one gasket shown in FIG. 1. With the increased separation between the ends of pipes 1 and 1A within the cylindrical coupling 13, in order to reduce possible frictional losses due to turbulence occurring in cavities C between the pipe ends as fluid flows through the pipes, telescoping pipe section 25 and 26 are provided to substantially bridge or close, but generally not seal, the gap. Telescoping sections 25 and 26 may be attached to the pipe ends by welding. It is to be understood that, if desired, more than the two gaskets A can be used in series to form a bellows-like structure. When relative movement of the pipe ends and the coupling is expected, regardless of how many gaskets are provided, the length of the grooves 11 and 11A and the length of the cylindrical coupling 13 will be adjusted accordingly, i.e., the grooves 11 and 11A have to be wide enough to allow the desired or expected amount of relative movement between the pipe ends and the cylindrical coupling. It should be understood that as the pipe ends move toward or away from one another, they move in relation to the cylindrical coupling so that jaws 15, 17, 19, and 21 will slide axially in grooves 11 and 11A. FIG. 2, as well as the other FIGURES, show the pipes at their limit of movement away from one another. With jaws 15, 17, 19, and 21 against shoulders 12 and 12A, the pipes 1 and 1A cannot move further apart. However, they can move toward one another until their ends abut to prevent further movement or until jaws 15, 17, 19, and 21 abut the back ends of grooves 11 and 11A to limit this movement. The maximum distance which the ends of pipes can move may be limited by either the width of the grooves 11 and 11A or by the length of gap between the ends of the pipes. Generally the more movement expected, the more gaskets will be provided and the wider the gaps will be.

The interior legs of the two gaskets, i.e., the adjacent legs that abut one another rather than abutting the incline front flange faces 9 and 9A, or both legs of the interior gaskets if more than two gaskets are used, are provided with slits or cut openings n1 to communicate fluid from cavities C to the cavity or cavities, shown by m, between the gaskets. Fluid in cavities C and m balance the pressure around the inside legs of the gaskets which is essential for functioning of two or more gaskets in series. The fluid pressure in cavities C will force the outside legs against the inclined front flange faces, as explained, to ensure sealing of the legs against such flanges, and will also force the gaskets against the inner surface of the cylindrical coupling to ensure sealing between the gasket and the coupling inner surface. In addition to reducing frictional losses and turbulence in fluid flowing through the pipes in the coupling, telescoping pipe sections 25 and 26 also protect the gaskets from the ravaging velocities of the fluid flowing in the pipes. Gap g1 is provided for the entrance of fluid into cavities C and m and to balance the fluid pressure around the extensions.

FIG. 3 shows a coupling similar to that of FIG. 2 with two gaskets A, but without the telescoping pipe sections. Also, the cut openings n1 are larger. Again, the pipes are shown at the limit of their relative allowed movement away from one another, but there is no rear shoulder for grooves 11 and 11A on the flange bodies 4 and 4A so relative movement of the pipe ends g2 toward one another are limited by abutment of the pipe ends g2 within the coupling. Generally, however, the positioning of the pipes and pipe ends in the coupling will be such that the pipe ends will not abut during normal expected expansion of the pipes.

FIG. 3 also shows the welds attaching the flange bodies 4 and 4A to pipe end portions 7 and 7A as forming part of the front and rear end faces rather than extending beyond these faces. This merely illustrates that there are various ways of welding the flange bodies to the pipes. It should also be realized that other attachment methods can be used. When plastic pipes are being joined, the flange bodies can be glued to the pipe end portions in a manner similar to other fitting that are normally glued to such pipes. Alternatively, mounting collars or split rings could be glued or otherwise secured to the pipes at the forward and rearward ends of the flange bodies and to the flange bodies to seal and secure them to the pipes. It should be realized that an advantage of the invention in providing flange bodies that are attached to the pipe end portions is that such flange bodies can easily be made to slide over pipes within the expected range of tolerances of pipe diameters and pipe ovalness and the flange bodies sealed around the pipe end portions by their attachment to the pipe end portions. Thus, the axial opening through a flange body 4 can be made to accept pipe end portions within the expected tolerance ranges and sealing of the flange body to the pipe end portion is accomplished by a sealing weld. The flange bodies 4 and 4A can be formed with front flange portions 8 and 8A of much tighter tolerances than can be formed on a pipe. This makes it practical to use a cylindrical coupling to join the pipes, where front flange portions 8 and 8A of relatively tight tolerances interface with the coupling and fit into the coupling end openings, rather than trying to fit the pipe ends themselves into the end openings of a cylindrical coupling.

Figure 4:
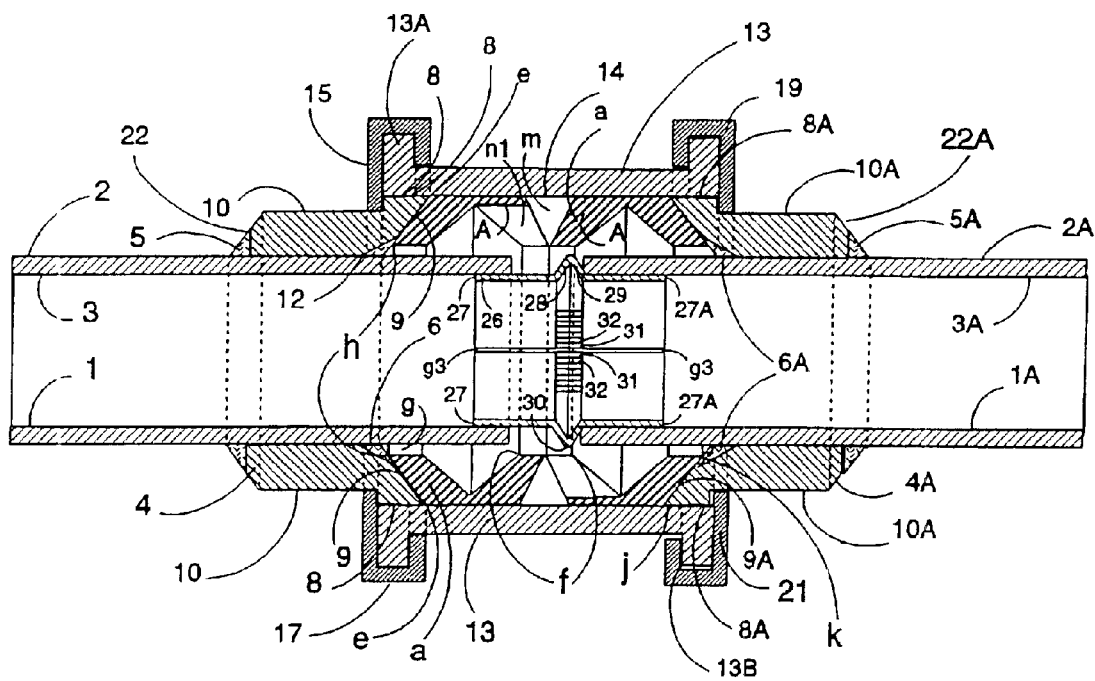
FIG. 4 is a longitudinal vertical section of a still further embodiment of the invention.

FIG. 4 shows a slidable insert 26 positioned between the pipe ends in a coupling similar to those shown in other figures. Thus, a cylindrical insert 26 with ends 27 and 27A formed of a spring type of material such as a metal or plastic sheet rolled into a cylindrical form, with slit g3 between the edges of the sheet, is inserted into the pipe ends during assembly of the joint, to substantially bridge the gap between pipe ends. A portion of the insert, in the form of a fold 30 with outside diameter greater than the inside diameter of the pipes provides opposite outwardly extending fold sides 28 and 29 which extend into the gap between the pipe ends to keep the cylindrical insert in position between the pipe ends and prevent it from sliding into and along the pipe sections away from the end portions thereof. The gap g3 and slits 32 between insert material 31 provided in the fold 30 allow fluid to flow into the gaps in and between the gaskets A which operate as previously described. The fold with screen also acts to prevent build-up of debris in the gaps between the gasket legs and the gaskets.

Figure 5:
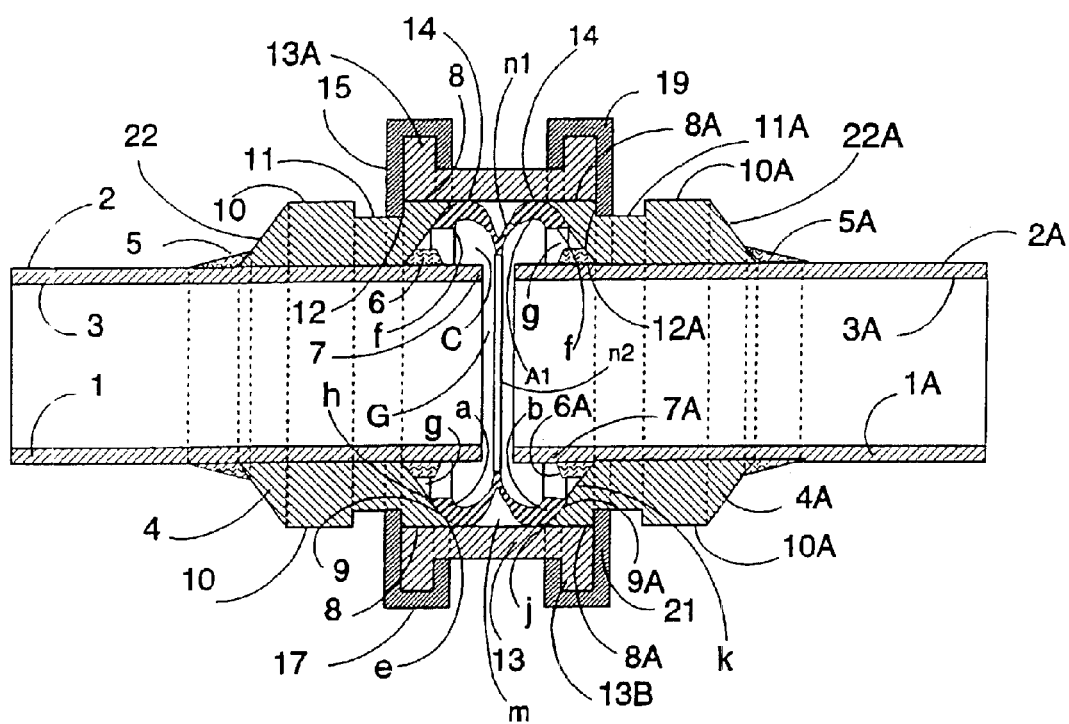
FIG. 5 is a longitudinal vertical section similar to that of FIG. 1, but showing a different embodiment of gasket.

FIG. 5 shows a coupling similar to that of FIG. 1 but with a different embodiment of gasket A1. In this embodiment, a single gasket A1 curves or arches inwardly from outer leg feet f of outer legs a and b to a central, inwardly directed joint n2. The arches press the legs a and b against the inclined front flange faces 9 and 9A for sealing and to hold the gasket in place. Again, fluid in cavity C forces gasket legs a and b against inclined front flange faces 9 and 9A to increase sealing pressure against such flanges and forces the gasket against inside surface 14 and 14A to increase sealing force against such inside surface. An opening n1 allows fluid flow from cavity C into cavity m to equalize the pressure in each cavity. FIG. 5 also shows a slightly different weld 6 and 6A.

Figure 6:
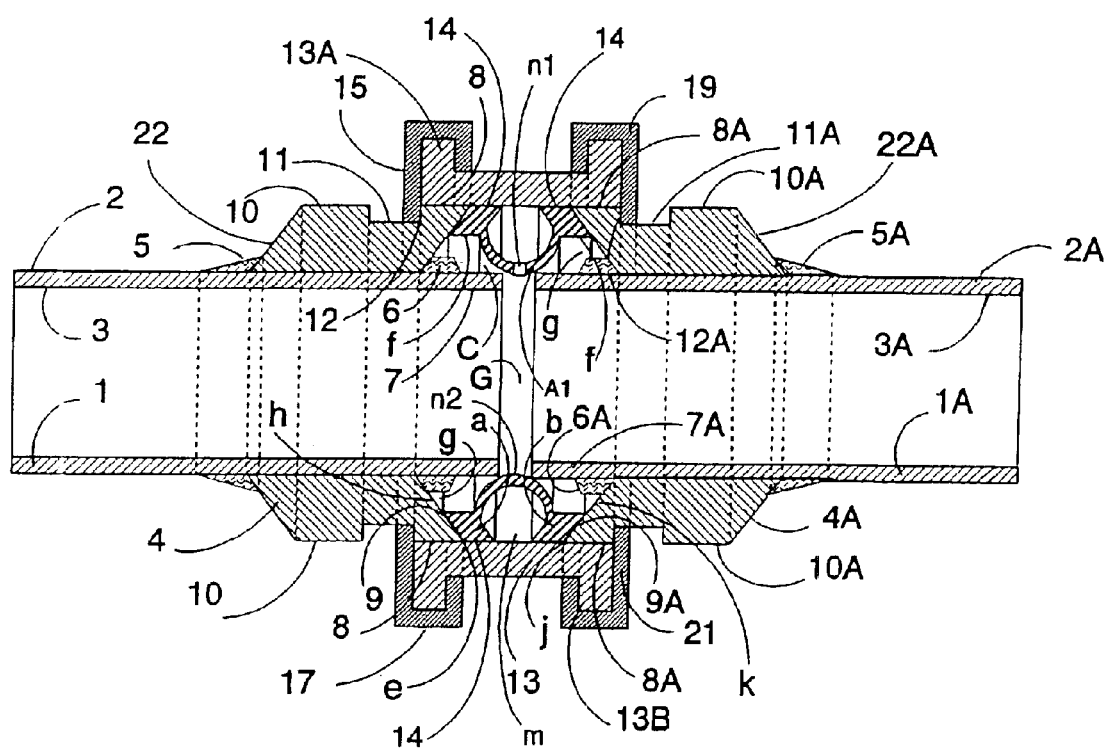
FIG. 6 is a longitudinal vertical section similar to that of FIG. 1, but showing a still different embodiment of gasket.

FIG. 6 shows a similar coupling with another different embodiment of gasket. In this embodiment, the gasket includes end portions or legs a and b which fit against respective inclined front flange faces 9 and 9A and against inner surface 14 and 14A. An arcuate center gasket portion n2 connects the end portions and presses the end portions against the inclined front flange faces 9 and 9A and inner surface 14 and 14A to hold the ends in sealing position and to hold the gasket in place. The gasket of FIG. 6 is particularly useful for high pressure situations because of the thick gasket material against the flange faces and inner surface and corners therebetween. Openings n1 allow pressure equalizing fluid into cavity m. In addition, because arcuate center portion n2 passes closely by the pipe ends, it restricts flow of debris into cavities C.

From FIGS. 5 and 6, it is apparent that various arch formations can be used to form a gasket which will exert holding and sealing pressure on the outer end portions or legs of the gasket. It will also be noted that the outer end portions or legs of the gaskets are arranged so that the pressure of the fluid against the gasket adds to the sealing pressure on the gasket.

Figure 7:
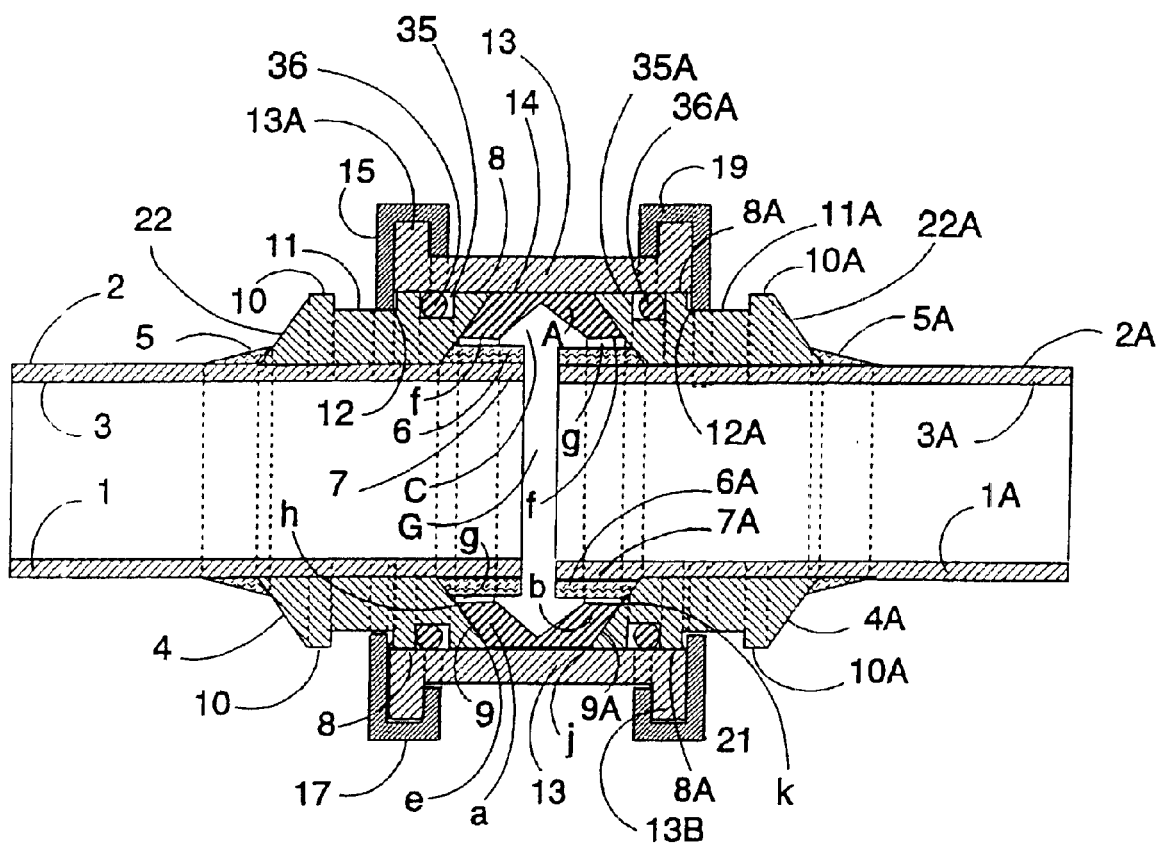
FIG. 7 is a longitudinal vertical section of an embodiment of the invention having a double seal.

FIG. 7 shows a coupling similar to that of FIGS. 1 and 2, with a single gasket spanning the pipe ends as in FIG. 1, and with additional O-rings 36 and 36A positioned in receiving recesses 35 and 35A, respectively, which provide a double seal between the pipe flange bodies 4 and 4A and cylindrical coupling 13. O-rings 36 and 36A can be used as an extra safety measure to ensure sealing when hazardous materials are flowing through the pipes.

Figure 8:
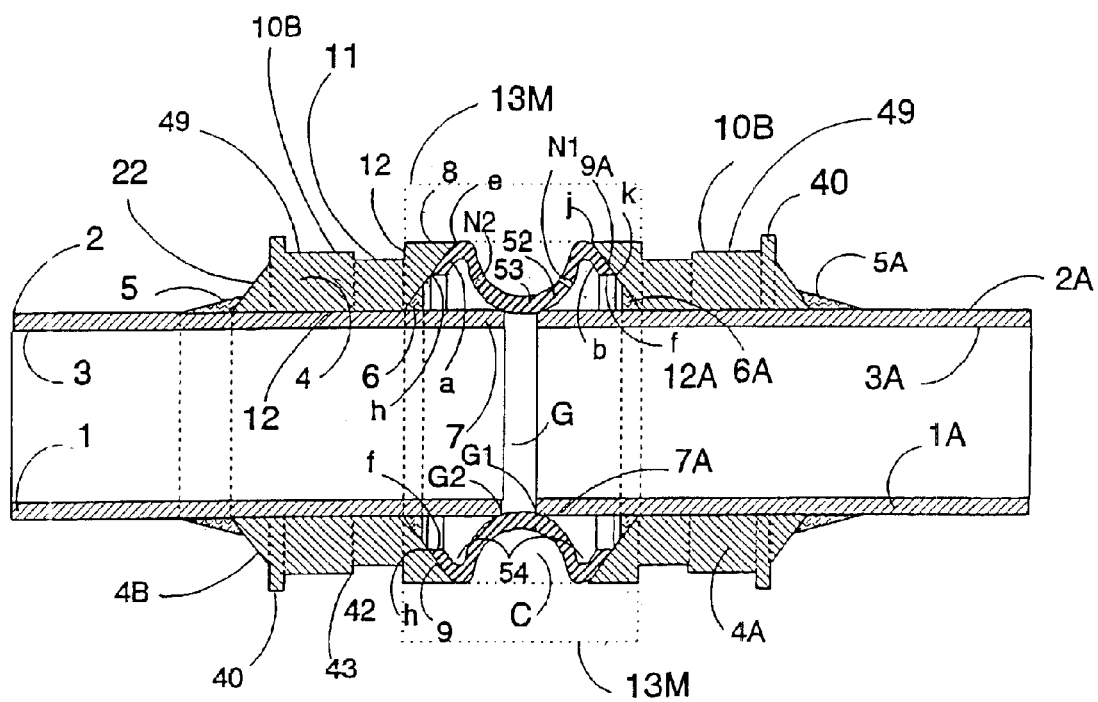
FIG. 8 is a longitudinal vertical section of an embodiment of the invention having a still different embodiment of gasket and showing a reduced diameter portion of each flange and a coupling stop.
Figure 10:
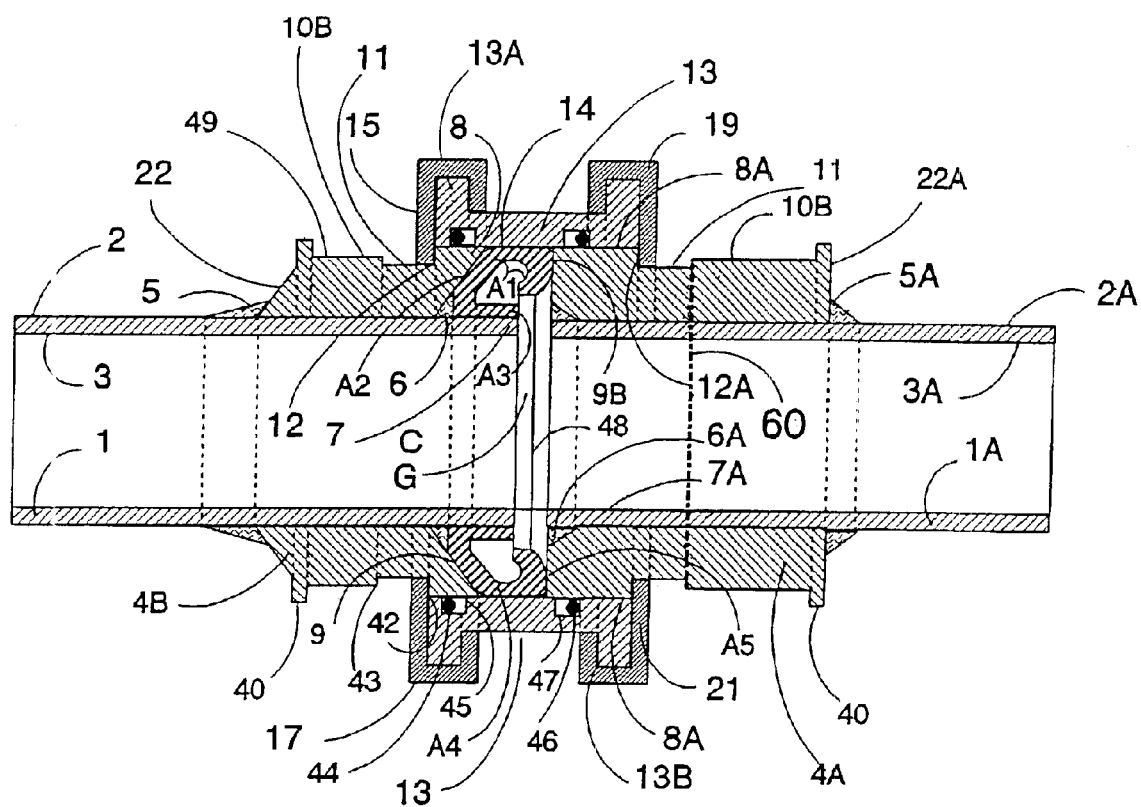
FIG. 10 is a longitudinal vertical section of a still further embodiment of the invention with a single gasket and single inclined flange.

FIG. 8 is similar to FIG. 6 but in FIG. 8 the coupling is not shown, only an indication of where the coupling would be is indicated schematically by broken line 13M, which facilitates to clarify the view of the invention. Two flanged bodies 4 and 4A are welded to pipes 1 and 1A as explained earlier. They are provided with radial flanges 40 to restrict the movement of the coupling beyond 40 as explained earlier in connection with stop 40 of FIG. 1. The outer diameter 10B of back flange portion 49 is kept smaller than the outer diameter of the front portions shown in other figures by diameters of 10 and 10A. If the cylindrical coupling includes seals, such as seals 44 and 46 as shown in FIG. 10, the smaller diameter flange portions 49 eliminate the interference of shoulder 43 of grooves 11 and 11A with these seals 44 and 46 when the cylindrical coupling is slid along the flanges. This eliminates the extra work of forcing seals 44 or 46 to cross over shoulder 43 and eliminates the extra chance to damage such seals when the coupling body is pushed over shoulder 43. Instead of two interferences for a seal, a seal will have only one interference with the shoulder 12 or 12A.

The gasket 53, FIG. 8, will seal to prevent any air flow from outside the coupling into the joined pipes. This deals with any vacuum related problems. The fluid from the pipe line enters cavity C through the plurality of openings N1 and N2. The ends e and j on opposite humps 54 of gasket 53 are pressurized and are pushed against the inner surface of the cylindrical coupling to seal against leakage of fluid between the coupling 13M and 10 and 10A. In FIG. 8, opening N1 is not placed over gap G between the ends of pipes 1 and 1A. To reach cavity C, fluid pushes gasket 53 radially outward from pipe ends G1 and G2, and fluid passes through openings N1 and N. If vacuum develops in the pipe line, gasket 53 closes against end G1 and G2. If it is required that no air should enter in to the pipe line at vacuum pressure, then, this gasket 53 serves that purpose.

Figure 9:
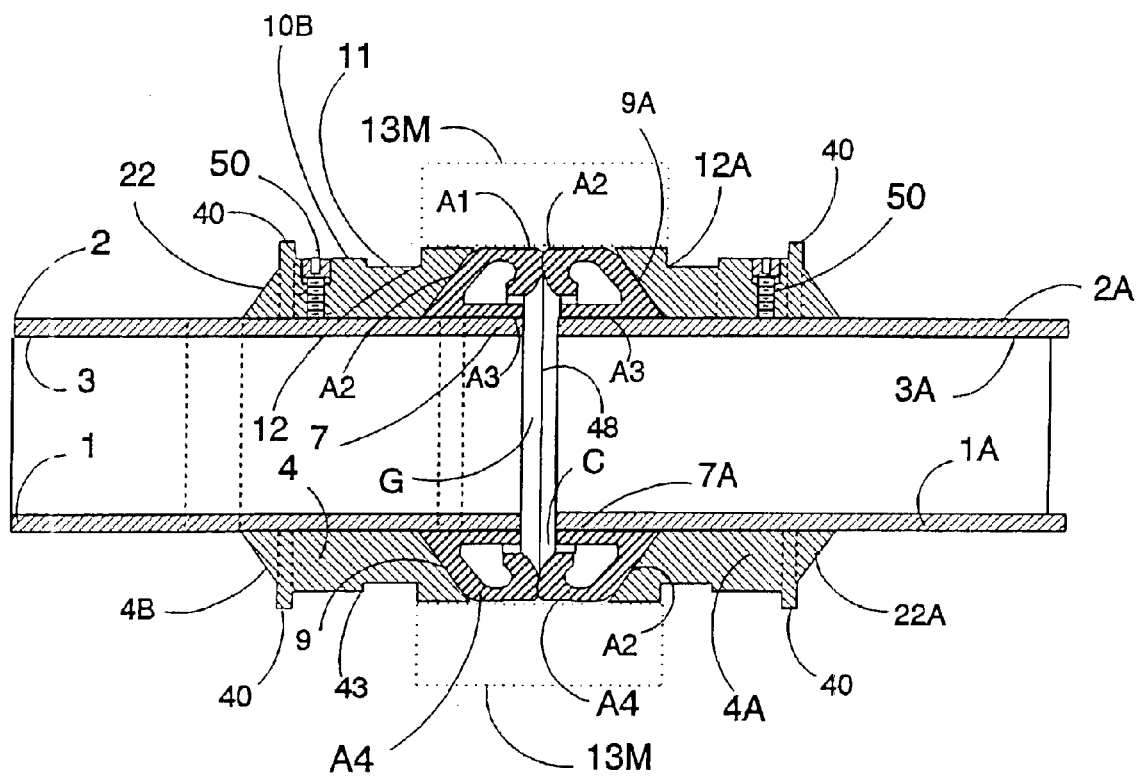
FIG. 9 is a longitudinal vertical section of a further embodiment of the invention with a still different embodiment of gasket, and showing the flanges secured to the pipe ends with set screws.

FIG. 9 shows two gaskets depicted by A4 which meet over the gap G between pipe ends. These gaskets are mounted over pipe end sections 7 and 7A. The pressurized fluid in cavity C pushes the gaskets outward on all sides thus capsulizing the fluid against leakage. When a low pressure thin wall pipe line is used, welding of flanges 4 and 4A is not required, and the pressure of a few set bolts or set screws shown by 50 are sufficient to hold flanges 4 and 4A to the pipes 1 and 1A. In stable ground, with low pressure pipe lines, welding of 4 and 4A is not needed.

FIG. 10 shows one flange 4B with inclined face A2 and one flange 4A with a flat radial face 9B. A single gasket A4 will seal against inclined surface A2, connector 13, and flat radial surface 9B. In any of the embodiments, rather than connecting pipes, the coupling could connect a dead end to a pipe. FIG. 10 shows schematically an imaginary dead end in broken lines 60, and its inner radial face is shown by 9B. The dead end can be a cover of any pressure vessel as well. It is clear that it is also practical to have one of the faces 9 or 9A to be a radial face and the other radially inclined face, and a single gasket A4 between them to seal the fluid from the pipe line. Thus, FIG. 10 shows practicality, where one gasket having side A3, A2 and circular side A1 can seal fluid on four sides 7, 9, 14 and radial face of 9B of radial flanged body 4C.

While the drawings show two jaws for attaching the coupling to the flange body on the pipe end portions, additional jaws that may be used do not show. It is clear from my referenced patents that more than two jaws can be used. Also, with the groove arrangement shown, a single jaw can be used. Further, any cylindrical coupling which has locking means, such as those shown in my U.S. Pat. Nos. 5,794,988 and 6,186,560, which can be keyed into peripheral grooves around the flange bodies, can be used. In addition, various other attaching means can be used in conjunction with other cooperating means on the flange body.

With the coupling of the invention, it is easy to release the cylindrical coupling and slide it along the pipe to expose the connection of the pipes. If the coupling is opened in two adjacent pipe connections, a length of pipe can easily be removed for repair of the pipe or of a part of the coupling. The gasket or gaskets, generally being somewhat flexible, do not interfere with such removal. Further, if only a single coupling is opened, in many instances the pipes can be moved enough in relation to one another to allow replacement of coupling parts.

While various shapes, angles, and corners have been shown within the coupling and as part of the gaskets, it should be realized that changes may be made, such as to the angle of the incline, and corners rounded or otherwise reconfigured without changing the function or result obtained. It is further understood that the flanges can be made of PVC, polyethelene, fiberglass, steel, iron or other materials chemically suited or matching the material of the pipe and suited for the particular requirements of the application for the pipe. In addition, the flanges can be secured and sealed to the pipe in any suitable manner such as by welding, as shown, gluing, etc. One purpose of the invention is to allow use of a cylindrical coupling with pipes that may not be sufficiently round to accept a cylindrical coupling. Thus, the flanges fit over the pipe ends with the pipes having acceptable pipe tolerance and the flanges are sealed to the pipes. The outer cylindrical interface surfaces of the flanges then provide the higher tolerances required for use with a cylindrical coupling.

Whereas the invention has been described with respect to the presently preferred illustrated embodiments, it should be understood that various changes may be made in adapting the invention to different embodiments without departing from the broader inventive concept disclosed herein and comprehended by the claims that follow.

What is claimed is:

1. A coupling for joining two pipes in end-to-end relationship, each pipe to be joined having an end portion with a pipe end, comprising:

a flange body sealably secured around the end portion of each pipe to be joined, each flange body having an inclined front flange face inclined forwardly as the face extends radially outwardly, an outer cylindrical interface surface adjacent the inclined front flange face, and means cooperable with a cylindrical coupling for attachment thereto;

a cylindrical coupling with opposite ends, each end having an opening sized to slidably fit over and receive therein the inclined front flange face and outer cylindrical interface surface of the flange body on one of the pipes to be joined, having an inner surface between the openings, and having securement means to cooperate with the means cooperable to secure the cylindrical coupling to the flange body; and at least one gasket having opposite legs and snugly fit into the inner surface of the cylindrical coupling between the ends of the pipes to be joined when received in the opposite openings of the cylindrical coupling so that a leg of the at least one gasket abuts the inclined front flange face received in each of the opposite openings of the cylindrical coupling.

2. A coupling for joining two pipes according to claim 1, wherein the flange body is secured around the end portion of the pipe by welding.

3. A coupling for joining two pipes according to claim 2, wherein the flange body is spaced from the pipe end and the inclined front flange face is inclined toward the pipe end.

4. A coupling for joining two pipes according to claim 3, wherein the means cooperable with a cylindrical coupling is a groove formed in the flange body adjacent the outer cylindrical interface surface and the securement means includes jaws which extend from the cylindrical coupling into the groove to attach the coupling on the end portion of the pipe.

5. A coupling for joining two pipes according to claim 4, wherein the at least one gasket is a plurality of gaskets snugly fit into the inner surface in side-by-side relationship with at least one leg of a side-by-side pair of legs having an opening to allow fluid flow from between the legs to between the side-by-side gaskets.

6. A coupling for joining two pipes according to claim 5, wherein the plurality of gaskets is two gaskets.

7. A coupling for joining two pipes according to claim 1, wherein the flange body is spaced from the pipe end and the inclined front flange face is inclined toward the pipe end.

8. A coupling for joining two pipes according to claim 1, wherein the means cooperable with a cylindrical coupling is a groove formed in the flange body adjacent the outer cylindrical interface surface and the securement means includes jaws which extend from the cylindrical coupling into the groove to attach the coupling on the end portion of the pipe.

9. A coupling for joining two pipes according to claim 1, wherein the means cooperable with a cylindrical coupling is a shoulder formed in the flange body adjacent the outer cylindrical interface surface and the securement means includes jaws which extend from the cylindrical coupling along the shoulder to attach the coupling on the end portion of the pipe.

10. A coupling for joining two pipes according to claim 1, wherein the at least one gasket is a plurality of gaskets snugly fit into the inner surface in side-by-side relationship with at least one leg of a side-by-side pair of legs having an opening to allow fluid flow from between the legs to between the side-by-side gaskets.

11. A coupling for joining two pipes according to claim 10, wherein the plurality of gaskets is two gaskets.

12. A coupling for joining two pipes according to claim 1, wherein the joined pipe ends are spaced apart within the cylindrical coupling, and additionally including means to substantially bridge the distance between the pipe ends.

13. A coupling for joining two pipes according to claim 12, wherein the means to substantially bridge the distance between pipe ends are telescoping lengths of pipe.

14. A coupling for joining two pipes according to claim 12, wherein the means to substantially bridge the distance between pipe ends is an insert positioned in the pipe ends to extend between the pipe ends, and means to keep the insert in position in and between the pipe ends.

15. A coupling for joining two pipes according to claim 14, wherein the means to keep the insert in position in and between the pipe ends is an insert portion extending from the insert into the space between the pipe ends to limit the movement of the insert in the pipe ends, and wherein the portion extending from the insert serves as a screen.

16. A coupling for joining two pipes according to claim 1, wherein the at least one gasket is of generally "V" shape.

17. A coupling for joining two pipes according to claim 1, wherein the at least one gasket includes an arcuate center portion connecting opposite end leg portions.

18. A coupling for joining two pipes according to claim 17, wherein the arcuate center portion extends over and in contact with the ends of the pipes to be joined to prevent flow of air into the pipes in the event of a vacuum condition in the pipes.

19. A coupling for joining two pipes according to claim 1, wherein the flange body includes an outer cylindrical surface having a diameter and spaced from the outer cylindrical interface surface by the means cooperable, and wherein the outer cylindrical interface surface has a diameter larger than the diameter of the outer cylindrical surface.

20. A coupling for joining two pipes according to claim 1, wherein the cylindrical coupling can slide axially over the cylindrical interface surface and the flange body additionally includes a stop positioned to limit the axial travel of the cylindrical coupling over the cylindrical interface surface.

21. A coupling for attachment to the end portion of a pipe having a pipe end, comprising:

a flange body sealably secured around the end portion of the pipe, said flange body having an inclined front flange face inclined forwardly as the front flange face extends radially outwardly, an outer cylindrical interface surface adjacent the inclined face, and means cooperable with a cylindrical coupling for attachment thereto;

a cylindrical coupling having an opening and inner surface sized to slidably fit over and receive therein the inclined front flange face and outer cylindrical interface surface, and having securement means to cooperate with the means cooperable to secure the cylindrical coupling to the flange body; and a gasket having opposite legs and snugly fit into the inner surface of the cylindrical coupling so that a leg thereof abuts the inclined front flange face when received in the opening of the cylindrical coupling.

22. A coupling for attachment to the end portion of a pipe according to claim 21, wherein the flange body is secured around the end portion of the pipe by welding.

23. A coupling for attachment to the end portion of a pipe according to claim 21, wherein the flange body is spaced from the pipe end and the inclined front flange face is inclined toward the pipe end.

24. A coupling for attachment to the end portion of a pipe according to claim 21, wherein the means cooperable with a cylindrical coupling is a groove formed in the flange body adjacent the outer cylindrical interface surface and the securement means includes jaws which extend from the cylindrical coupling into the groove to attach the coupling on the end portion of the pipe.

25. A coupling for attachment to the end portion of a pipe according to claim 21, wherein the means cooperable with a cylindrical coupling is a shoulder formed in the flange body adjacent the outer cylindrical interface surface and the securement means includes jaws which extend from the cylindrical coupling along the shoulder to attach the coupling on the end portion of the pipe.

26. A coupling for attachment to the end portion of a pipe according to claim 21, wherein the at least one gasket is a plurality of gaskets snugly fit into the inner surface in side-by-side relationship with at least one leg of a side-by-side pair of legs having an opening to allow fluid flow from between the legs to between the side-by-side gaskets.

27. A coupling for attachment to the end portion of a pipe according to claim 26, wherein the plurality of gaskets is two gaskets.

28. A coupling for joining two pipes according to claim 21, wherein the at least one gasket includes an arcuate center portion connecting opposite end leg portions.

29. A coupling for joining two pipes according to claim 28, wherein the arcuate center portion extends over and in contact with the ends of the pipes to be joined to prevent flow of air into the pipes in the event of a vacuum condition in the pipes.

30. A coupling for joining two pipes according to claim 21, wherein the flange body includes an outer cylindrical surface having a diameter and spaced from the outer cylindrical interface surface by the means cooperable, and wherein the outer cylindrical interface surface has a diameter larger than the diameter of the outer cylindrical surface.

31. A coupling for joining two pipes according to claim 21, wherein the cylindrical coupling can slide axially over the cylindrical interface surface and the flange body additionally includes a stop positioned to limit the axial travel of the cylindrical coupling over the cylindrical interface surface.

32. A flange to be slid onto and sealably secured around the end portion of a pipe to be joined by a cylindrical coupling to the end portion of another pipe, comprising:

a cylindrical flange body having an axial opening therethrough to receive the end portion of a pipe to which the flange is to be secured;

an inclined front flange face inclined forwardly as the face extends radially outwardly;

a front flange portion forming an outer cylindrical interface surface adjacent the inclined front flange face;

a shoulder formed by a groove in the flange body adjacent the outer cylindrical interface surface cooperable with a cylindrical coupling for attachment of the cylindrical coupling thereto; and an outer cylindrical surface having a diameter and spaced from the outer cylindrical interface surface by the groove and wherein the outer cylindrical interface surface has a diameter larger than the diameter of the outer cylindrical surface.

33. A flange to be slid onto and sealably secured around the end portion of a pipe to be joined by a cylindrical coupling to the end portion of another pipe, comprising:

a cylindrical flange body having a front end, and an axial opening therethrough to receive the end portion of a pipe to which the flange is to be secured;

an inclined front flange face at the front end on the flange inclined forwardly as the face extends radially outwardly;

a front flange portion forming an outer cylindrical interface surface adjacent the inclined front flange face;

a shoulder adjacent the outer cylindrical interface surface cooperable with a cylindrical coupling for attachment of the cylindrical coupling thereto; and a stop positioned to limit axial travel of a cylindrical coupling over the cylindrical interface surface.

* * * * *